(No Model.) 3 Sheets—Sheet 2.
L. OLSEN & N. E. BURNS.
COMPOUND METAL WORKING MACHINE.
No. 369,872. Patented Sept. 13, 1887.
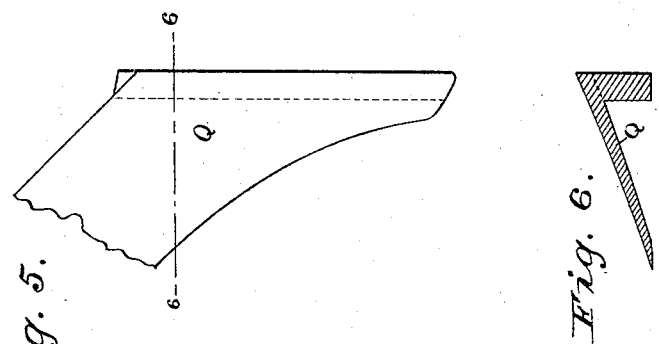
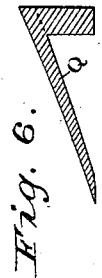
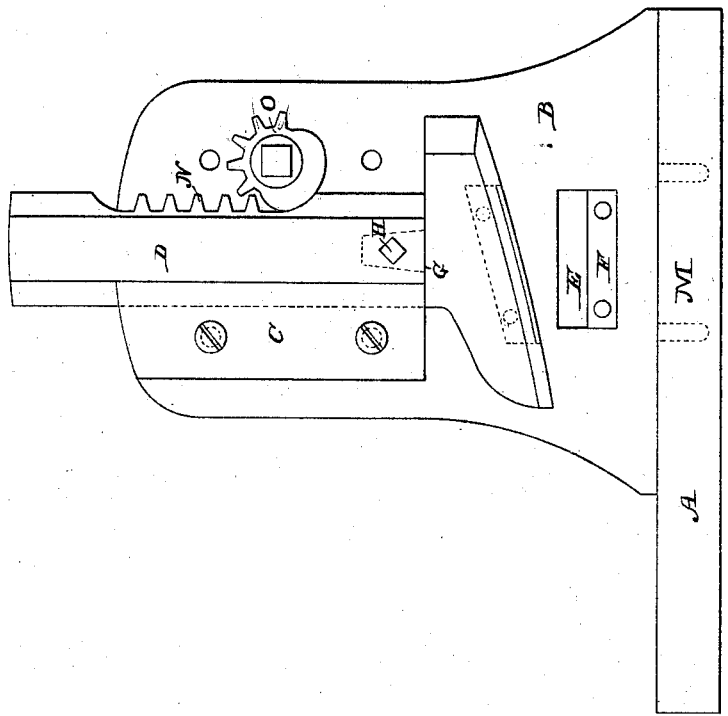
WITNESSES
INVENTOR
Lewis Olsen,
Nevin E. Burns,
By their Attorneys (No Model.) 3 Sheets—Sheet 3.
L. OLSEN & N. E. BURNS.
COMPOUND METAL WORKING MACHINE.
No. 369,872. Patented Sept. 13, 1887.
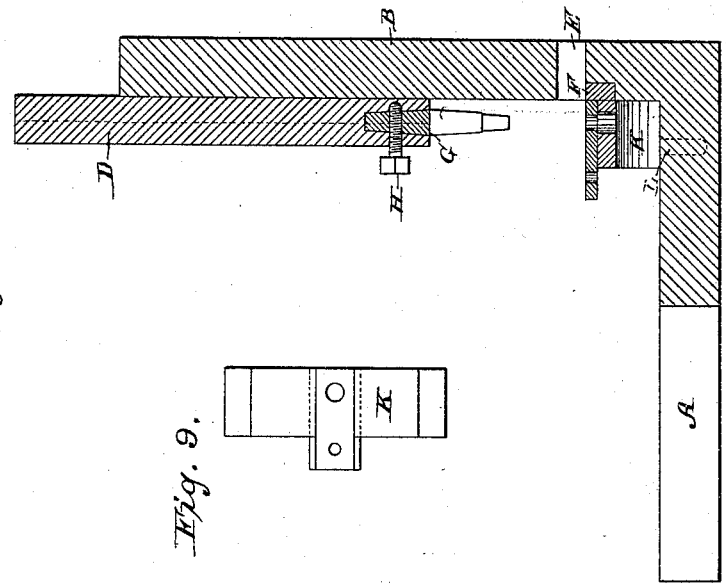
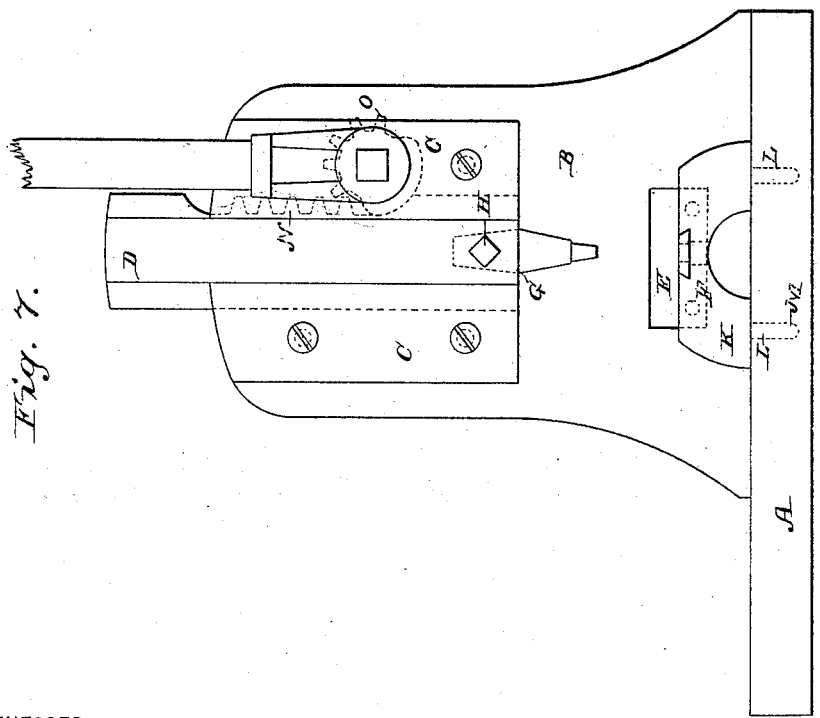
WITNESSES
E. A. Newman.
C. M. Newman.
INVENTOR
Lewis Olsen,
Nevin E. Burns,
By their Attorneys
Baldwin Hopkins & Peyton.

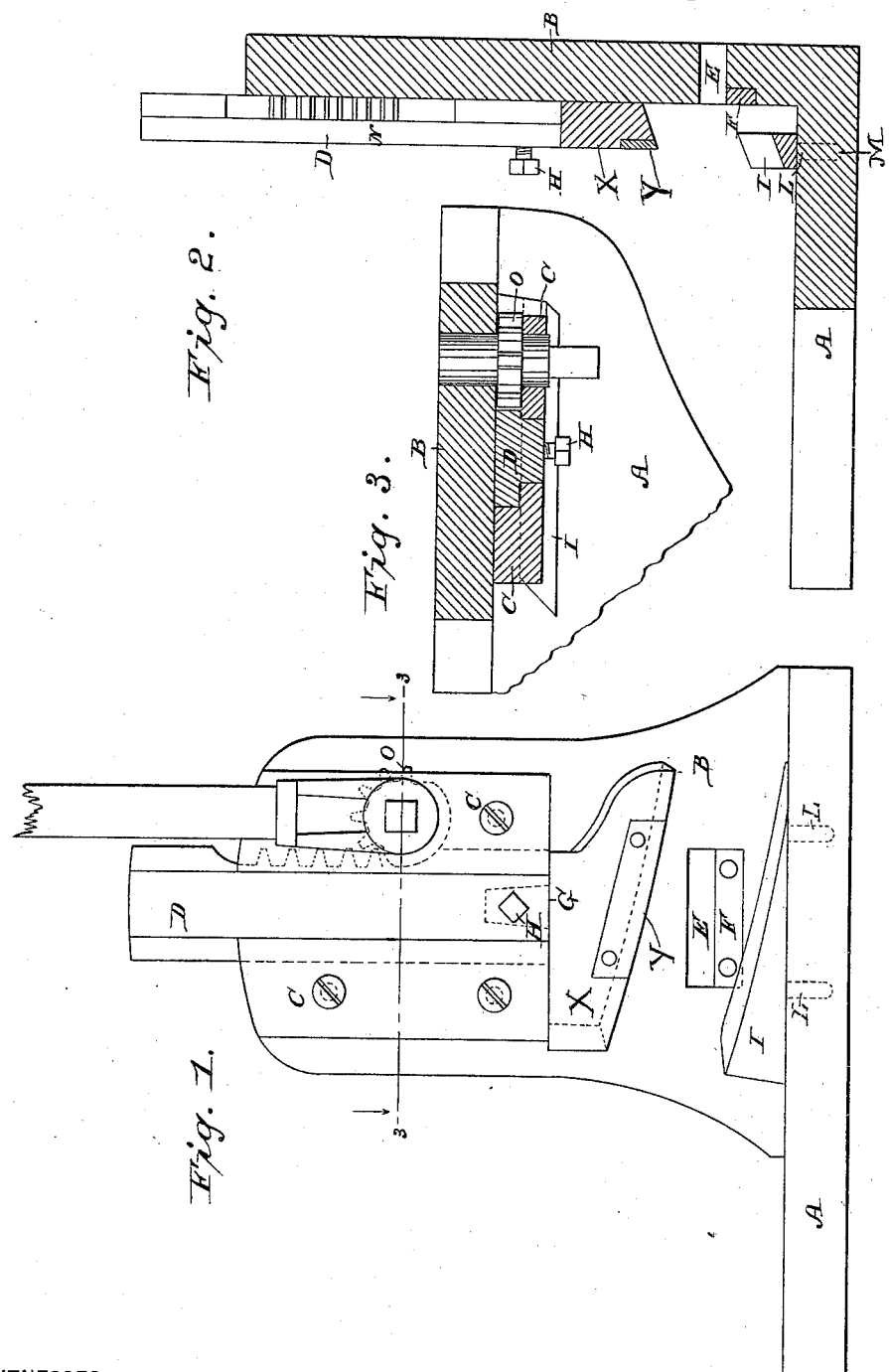

UNITED STATES PATENT OFFICE.

LEWIS OLSEN AND NEVIN E. BURNS, OF RIVER FALLS, WISCONSIN.

COMPOUND METAL-WORKING MACHINE.

SPECIFICATION forming part of Letters Patent No. 369,872, dated September 13, 1887.

Application filed January 8, 1887. Serial No. 223,779. (No model.)

*To all whom it may concern:*

Be it known that we, LEWIS OLSEN and NEVIN E. BURNS, of the city of River Falls, Pierce county, State of Wisconsin, have invented certain new and useful Improvements in Welding and Metal-Working Machines, of which the following is a specification.

The object of our invention is to produce a simple effective machine for welding metals together by pressure after they have been brought to a proper welding heat, more especially to weld the lays or shares of plows to the landsides of the same. In connection with a machine for such use we have provided attachments and adapted the structure for shearing plates and bars of metal and for punching the same, thus producing a combined welding, cutting, and punching machine for metal-workers.

In the accompanying drawings, illustrating our improved machine, Figure 1 is an elevation showing an upper and lower die in plane for welding the plowshares and landsides. Fig. 2 is a vertical section at right angles to that shown in Fig. 1. Fig. 3 is a sectional view on the line 3 3 of Fig. 1. Fig. 4 is another elevation showing the upper die of Fig. 1 in reverse position for shearing or cutting metal. Fig. 5 is a view of a plowshare and landside. Fig. 6 is a section of the same. Fig. 7 is another elevation showing a punch and anvil. Fig. 8 is a vertical section taken at right angles with Fig. 7. Fig. 9 shows an anvil detached.

Referring to the letters in aid of a description in detail of our improvements, A indicates the bed-plate, and B an upright post or standard, which may be integral with the bed-plate, or the two may be firmly secured together.

C C indicate guideways, and D a plunger or sliding bar which reciprocates vertically within the guideways.

E indicates an opening through the post, provided with a fixed shear-plate, F.

G indicates a socket in the end of the plunger, and H a pin or set-screw by means of which a welding die, X, a shear-plate, or a punch may be secured to the lower end of the plunger, each implement being provided with a suitable shank to fit the socket in the plunger, and to be held in place by means of the pin or set-screw.

I indicates a lower die or welding anvil or block detachably secured to the bed-plate. K indicates a different form of block or anvil suitable for a punch. These blocks or anvils are provided with studs or pins L, which fit into corresponding holes, M, in the bed-plate, to hold them in place, from which they may be readily removed.

N indicates a rack on the plunger, and O indicates a pinion gearing with the rack and operated by means of a crank, as shown, to reciprocate the plunger; but any other ordinary means may be employed for this purpose.

In Fig. 5, Q indicates a plowshare and landside in position as it is formed in the machine by pressure, welding and uniting the two parts together. Other forms of dies may be employed.

The method of operation of our improved machine is as follows: For welding metal shapes—as, for example, plowshares and landsides—a male die of proper form is attached to the plunger and a female die to the bed-plate. The share and landside pieces of metal, having first been brought to a proper welding heat, are placed in the machine in proper position, and the plunger, with the die, is forced down upon them and they are welded by the pressure. By substituting other dies of proper forms other pieces of metal may be welded or shaped. The dies may be removed and punches or cutting-shears substituted, and the machine be used for cutting or punching metal plates and bars. The opening in the standard provides for the operation of punching and cutting by admitting the passage through it of the metal bars or plates being worked when necessary. The die X has a shear-plate, Y, on it, so that it can be reversed and used for shearing. (See Fig. 4.)

We do not claim that it is new to weld heated metals together by pressure, or that it is new to punch or shear metals; but

What we claim as new, and desire to secure by Letters Patent of the United States, is—

1. The combination of a bed-plate carrying a detachable die or anvil, with a standard having an opening, E, and a shear-plate, F, and a reciprocating plunger adapted to carry interchangeably a die, punch, or shear-plate, whereby either punching, shearing, or forming may be performed at will, substantially as set forth.

2. The combination of a bed-plate provided with a detachable die or anvil, I, a standard or post carrying a reciprocating plunger, and a detachable and reversable die and shear, X, the standard being provided with an opening, E, and a shear-plate, F, substantially as set forth.

In testimony whereof we have hereunto subscribed our names.

LEWIS OLSEN.
NEVIN E. BURNS.

Witnesses:
SARAH S. SANDERSON,
F. L. PERRIN.